Oct. 5, 1937. J. GEIGER 2,094,739

SAFETY BUMPER FOR AUTOMOBILES

Filed Oct. 30, 1936

INVENTOR.
JOSEF GEIGER
BY Peter M. Boesen
ATTORNEY.

Patented Oct. 5, 1937

2,094,739

UNITED STATES PATENT OFFICE 2,094,739

SAFETY BUMPER FOR AUTOMOBILES

Josef Geiger, Milwaukee, Wis.

Application October 30, 1936, Serial No. 108,402

4 Claims. (Cl. 293—55)

This invention relates to new and useful improvements in safety bumpers for automobiles, and it has for its object to prevent automobile accidents, with their incidental loss of human life and destruction of property, to the amazing extent and scope, never hitherto thought possible, and, when such accidents do happen, to reduce the effect of same to an insignificant occurrence.

The above results have been accomplished by embodying in my new system means that will take the momentum out of a crash, by imparting to the automobiles involved in such crash a mutually repulsive characteristic as to the force of impact, or a limited recoiling action, in combination with highly developed shock absorbing features.

As another advantage of my device may be noted that engines of colliding cars are automatically stopped, as soon as the car pushes, or compresses the bumpers to a certain extent, as a center bumper push rod in such instance will push an electric button connected to the distributor box, while at the same time the brakes are automatically being pushed into action, without regard to whether it is a rear or front crash.

As a still further advantage may be noted that the bumper piston springs may be regulated and exchanged according to the weight of the car, or chassis, and that this safety bumper can be used efficiently on any type of car, with or without engine stop and brake connection.

It will clearly appear that the invention is very comprehensive of scope, and should prove a great saver of human lives.

Thus this invention prevents the possibility of a car catching fire, because the engine could not be stopped quickly enough at the time of the crash.

Furthermore this invention eliminates the danger of serious accidents due to poor and ineffective bumpers, with hardly any shock absorbing characteristics, which often, at the time of an accident, causes the driver to be thrown out of his seat and consequently loses control of the engine and brakes.

It is obvious that a combination of the above improvements will in a most desirable manner solve these important problems.

As the construction of the said improvements is comparatively simple, the cost of installation should be proportionately low, and said installation may be made in a very short time.

With the above and other objects in view, this invention consists of the novel features of construction, combination and arrangement of parts, hereinafter fully described, claimed and illustrated in the accompanying drawing forming part of this specification, and in which similar characters of reference indicate corresponding parts in all views, and in which:—

Figure 9 is a transverse sectional view of a rubber trimming, covering the front of said safety bumper; while

Figure 1:
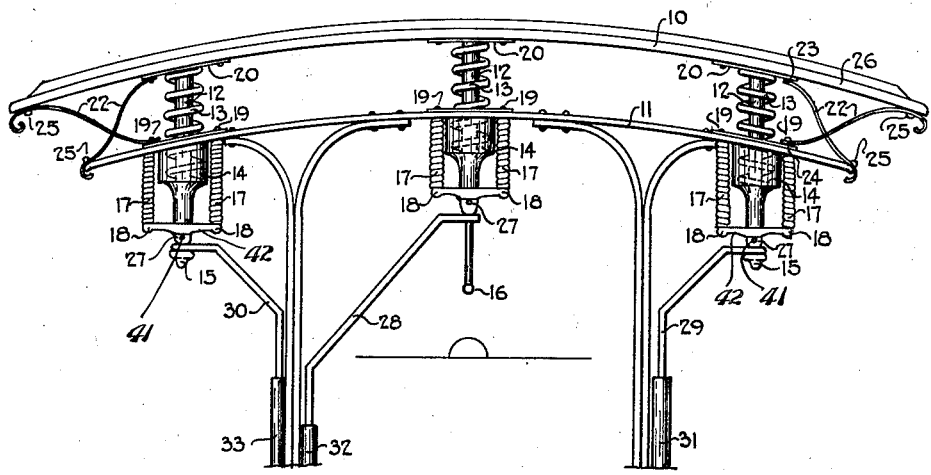
Figure 1 is a plan view, showing a safety bumper, with piston shock absorbing springs and safety stop connection.

While various modifications may be made as to the sizes and measurements, according to the different models of cars, and weight of the chassis, the illustrations herein are thought to clearly set forth the principles of my safety bumper combination.

Figure 4:
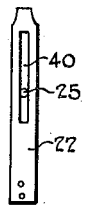
Figure 4 is another detail view, showing a short side end spring provided with a center slot for the bolt head to move in during flattening of the spring.

Referring more particularly to the drawing,

Figure 1 shows a safety bumper with two slightly curved steel plates 10 and 11, of a suitable width, and, mounted between these, three piston push rods indicated at 12. Three master springs, shown at 13, encircle said push rods. A portion of the master springs is resting in part of the enlarged tube indicated at 14, which latter has for its purpose to receive and take up a master spring entirely, when this is pushed or pressed together through an exerted pressure upon the plate 10. The center piston push rod is elongated so as to push an electric button. The two side piston push rods are shorter and are having a nut-member screwed upon the end thereof, as indicated at 15, while the center piston push rod is covered with a rubber head, as shown at 16. Counter-acting piston side springs 17 are being fastened on one side to a transverse bracer, or nut-member, as indicated at 18, while the other end is secured to a little ring-shaped bolt, indicated at 19, which bolt holds the enlarged upper end tube 14, shown in Figure 5, and the bumper steel plate 11 together. More bolts, however, may be used to hold said parts together, and especially the end of the enlarged tube 14 and the curved steel plate 11. The end portion of the piston push rod 12 is indicated at 20 and fastened to the inner side of the bumper steel plate in any suitable manner, for instance by small bolts. The narrow end portion of tube 14 is made to contact a rubber washer shown in Figure 6. Short side end springs 22, as shown especially in Figure 4, are mounted between the plates 10 and 11 and are having one of their ends securely fastened to these, as shown at 23 and 24, while the other ends of said springs are loosely secured to the said plates 10 and 11 by means of bolts 25, which latter are adapted to slide in the slot 40 formed in said spring 22.

Figure 10:
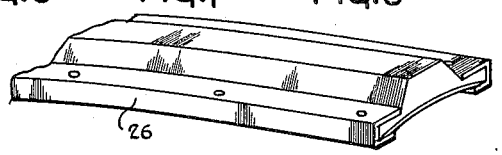
Figure 10 is an elevational view showing part of a nickel plated enclosure of the bumper plate, holding the rubber trimming in place.

At 26 is shown a nickel plated enclosure of the bumper plate illustrated in Figure 10. At 27 in Figure 1 is shown a hole for the little split-bolt illustrated in Figure 8, and indicated by the numeral 41. At 28, 29 and 30 are shown push rods for mechanical brakes or piston push rods for hydraulic expanding brakes, while 31, 32 and 33 show tubes adapted to have coil spring connections to a cross member for tightening the brakes through a brake operating lever link, if hydraulic, as a separate linkage serves to connect the end of the master cylinder piston push rod.

Figure 2:
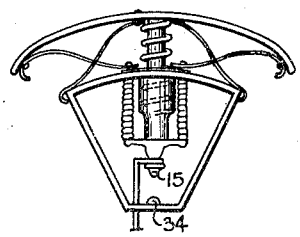
Figure 2 is a similar view, showing a short side rear bumper, with shock absorbing piston springs and safety stop connection.

Figure 2 shows the improvement of my safety bumper, as used on a somewhat different kind of model. Thus 34 indicates an electric contact that leads to the distributor box for stopping the engine.

Figure 3:
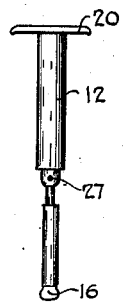
Figure 3 is a detail view, showing the center piston elongation, or push rod, provided with a rubber head, and adapted to push the electric button on the front of a chassis so as to disconnect the electrical contact that leads to the distributor box, or ignition, and thereby stop the engine.

Figure 3 shows the center piston push rod elongated with a rubber head thereon, to push the electric contact only when the safety bumper has been compressed by a hit of such magnitude or force, as to press or submerge the master spring, or springs, in to the enlarged end of the tube 14. A rubber head is shown at 16, while 27 indicates a pin hole for a split bolt and also a little notch for holding the push rod on its place. At 20 is shown the enlargement of the end of the piston push rod 12, which is made of steel and which end may be fastened by a bolt, or welded on the inside of the bumper steel plate 10.

Figure 4 shows an end spring 22 with a bolt head indicated at 25, which latter moves within the slot 40 in flattening the spring, when the safety bumper is pressed together. Side springs, as hereinbefore mentioned, are fastened at one end to the bumper steel plates.

Figures 5, 6:
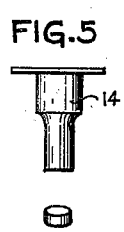
Figure 5 is a detail elevational view, showing an enlarged tube to hold the piston and piston master spring during the sliding motions.
Figure 6 is a detail elevational view, showing a rubber washer to be inserted in to the member illustrated in Figure 7, as a protection against the flattening of the end piece of the enlarged tube, shown in Figure 5.

Figure 5 shows a tube with an enlarged end portion, as indicated at 14, adapted to hold and slidingly receive a piston push rod and piston master spring therein, permitting the submersion of the master spring into the enlarged end portion of said tube, as soon as the bumper has been hit with sufficient force to be pressed together.

The enlarged portion of the tube 14 emerges through the inside of the bumper plate 11 into which it is welded or bolted.

Figure 6 shows a small rubber washer for insertion in the lower part of the nut-member, or bracer, indicated at 18, in order to protect the narrow end piece of the enlarged tube 14 against being flattened on its end while the push rod slides back.

Figures 7, 8:
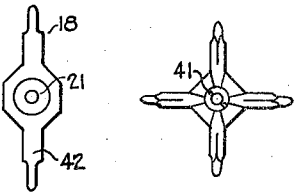
Figure 7 is a top elevational view of a bracer, or nut-member with said rubber washer inserted therein, and showing also two short side pieces thereon adapted to hold and support two piston side springs during the push and counter-action of the latter.
Figure 8 is a bottom elevational view of a bracer or nut-member with four side pieces thereon adapted to support and hold four piston side springs in place, showing also a small split-bolt.

Figure 7 shows the lower part of the nut-member 18 and the inserted rubber washer 21. The short side pieces 42 may have holes therein and are intended to support the piston side springs during the push and counteraction, and to hold said springs in their place.

Figure 8 shows the upper part of the nut-member 18, having four side pieces adapted to hold four piston side springs, if necessary. The little split bolt 27' will keep the nut-member from turning backward.

Figure 9:

Figure 9 shows a side cut of the rubber trimming, which covers the front of the safety bumper in order to absorb the shocks to some extent; said trimming gives an excellent appearance to the safety bumper.

Figure 10 shows part of a nickel plated enclosure of the bumper plate to hold the said bumper plate 10 and rubber trimming together, while screws may be used for the fastening thereof.

It is obvious that changes may be made in the form, construction and arrangement of the several parts, as shown, within the scope of the appended claims, without departing from the spirit of the invention, and I do not therefore wish to limit myself to the exact construction and arrangement shown and described herein.

What I claim as new, and desire to secure by Letters Patent of the United States, is:—

1. A safety bumper of the class described, comprising two slightly curved steel plates, piston push rods mounted between said plates, and master coiled springs encircling said push rods for absorbing the shock, flat steel springs disposed between said plates, and having one end thereof slidable with respect to said plates, a tube with an enlarged end portion arranged adjacent the inner steel plate, a bracer provided with lateral projections, piston side springs supported by the latter during operation, and a rubber washer inserted in said bracer for cooperation with said enlarged tube in protecting the latter from flattening around the piston push rod.

2. In a device as claimed in claim 1, and wherein a rubber trimming is mounted upon the outer steel bumper plate, and a nickel plated enclosure for securing said trimming to the bumper plate.

3. A safety bumper of the class described, comprising two slightly curved steel plates, two short side piston push rods connected at one end to mechanical push rods, a coiled master spring encircling the other end of said push rods, a center piston elongation with a rubber head on one end thereof, and a coiled master spring encircling the other end and adapted to actuate an electric button, when the outer steel plate approaches the inner steel plate, a tube secured to the inner steel plate, and adapted to receive a part of the piston push rod therein, part of the master spring being normally disposed within said tube, the latter being adapted to have the coiled master spring entirely submerged therein at the time of an automobile crash.

4. A safety bumper of the class described, comprising two slightly curved steel plates, two short side piston push rods connected at one end to mechanical push rods, a coiled master spring encircling the other end, a center piston elongation with a rubber head on one end thereof, and a coiled master spring encircling the other end, said elongation being adapted to actuate an electric button, a bracer provided with lateral projections adapted to receive counter-acting springs thereon, the other ends of the springs being secured to a small ring-shaped bolt at the inner bumper steel plate, whereby to regulate the counter action of different weights of cars.

JOSEF GEIGER.